(12) United States Patent
Peters

(10) Patent No.: US 6,871,797 B2
(45) Date of Patent: Mar. 29, 2005

(54) TURBINE ENGINE NOZZLE

(75) Inventor: Donald W. Peters, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/614,632

(22) Filed: Jul. 7, 2003

(65) Prior Publication Data

US 2005/0011195 A1    Jan. 20, 2005

(51) Int. Cl.[7] .............................................. F02K 1/06
(52) U.S. Cl. .............................................. 239/265.37
(58) Field of Search ................... 239/265.37, 265.41, 239/265.39, 265.19

(56) References Cited

U.S. PATENT DOCUMENTS

| 4,440,347 A | | 4/1984 | Madden et al. | |
| 5,511,376 A | * | 4/1996 | Barcza | ................ 60/230 |
| 6,398,129 B1 | | 6/2002 | Johnson | |

* cited by examiner

*Primary Examiner*—Ehud Gartenberg
(74) *Attorney, Agent, or Firm*—Bachman & LaPointe, P.C.

(57) ABSTRACT

A convergent/divergent nozzle for a gas turbine engine has a throat portion of non-constant radius of curvature varying from an upstream high value to an intermediate low value and then to a downstream high value.

4 Claims, 2 Drawing Sheets

TURBINE ENGINE NOZZLE

U.S. GOVERNMENT RIGHTS

The invention was made with U.S. Government support under contract N00019-02-C-3003 awarded by the U.S. Navy. The U.S. Government has certain rights in the invention.

BACKGROUND OF THE INVENTION (1) Field of the Invention

This invention relates to gas turbine engines, and more particularly to convergent/divergent exhaust nozzles for gas turbine engines.

(2) Description of the Related Art

A well developed art exists in the field of turbine engine nozzles. U.S. Pat. No. 6,398,129 discloses an exemplary prior art nozzle. That exemplary nozzle is an axisymmetric nozzle having an array of flap pairs: a convergent flap upstream and a divergent flap downstream. The divergent flaps may be articulated through a variety of orientations associated with modes of the engine. The exemplary divergent flap includes, in longitudinal section, a continuously curving convex upstream portion of a given radius of curvature and one or more straight portions downstream. During articulation of the flap between modes, the instantaneous aerodynamic throat of the nozzle will occur at a location along the upstream portion.

BRIEF SUMMARY OF THE INVENTION

One aspect of the invention involves an exhaust nozzle for a gas turbine engine. A first portion has an interior surface converging in a downstream direction. A second portion has an interior surface downstream of the interior surface of the first portion. The first and second portions may each comprise a circumferential array of flaps. Each flap in the second portion may be coupled to the first portion for articulation through a range of mode orientations. The interior surface of the second portion along each flap has a central longitudinal radius of curvature that from upstream to downstream has: a first value along a first flap portion; at least a second value, less than the first value and between (inclusively unless noted) 0.25 inch and 1.0 inch along a second portion; and at least a third value, less than the first value, and between 5.0 inches and 10.0 inches along a third portion.

In various implementations, the radius of curvature may be essentially infinite along the first portion. The radius of curvature may continuously increase from a low of between 0.25 inch and 5.0 inches to a high of between 8.0 inch and 14.0 inches. The continuous increase may be smooth or stepwise occur over a longitudinal span of between 2.0 inches and 3.0 inches. The range of orientations may extend between a low mode orientation wherein a ratio of an exit area to a throat area is between 1.05:1 and 1.5:1 and a high mode orientation wherein the ratio is larger than in the low mode and between 1.3:1 and 2.0:1. The ratio may be between 1.1:1 and 1.3:1 in the low mode and 1.4:1 and 1.5:1 in the high mode. Between the low and high mode orientations, a throat radius may change by less than 0.5%. That change may be less than 0.2%. Each flap may be pivotably coupled to the first portion for rotation about an associated hinge axis during transition between low and high modes. The hinge axis may have a first radial distance from a centerline of the nozzle. The nozzle second portion may have a throat having a second radial distance from the centerline and a first longitudinal distance from the hinge axis. A ratio of the first longitudinal distance to a longitudinal flap length from the hinge axis to an outlet end is between 0.05:1 and 0.20:1.

Another aspect of the invention involves an exhaust nozzle for a gas turbine engine including an upstream portion having a number of circumferentially arrayed first flaps and an interior surface converging in a downstream direction. The downstream portion may include a number of circumferentially arrayed second flaps each hinged relative to an associated one of the first flaps. The downstream portion may include a downstream outlet and an interior surface downstream of the interior surface of the upstream portion. A longitudinal profile of the downstream portion interior surface has an essentially straight first portion. A convex second portion is downstream of the first portion and has a continuously increasing radius of curvature. The surface may be smooth and the increase may be smooth or stepwise. An essentially straight third portion is downstream of the second portion.

In various implementations, the nozzle may include a number of circumferentially arrayed third flaps, each outboard of and hinged relative to an associated one of the second flaps. The radius of curvature of the second portion may vary from an upstream value of between 0.25 inch and 0.5 inch to a downstream value of between 8.0 inches and 14.0 inches over an axial span of at least 2.0 inches.

Another aspect of the invention relates to a convergent/divergent axisymmetric exhaust nozzle for a gas turbine engine. There is a hinge pivot at the juncture of where the convergent portion and the divergent portion of the nozzle meet. The convergent and divergent portions each include a number of circumferentially spaced axially extending flaps. A radius throat has a surface exposed to the working medium of the engine and is located downstream of the hinged pivot. The surface of the radiused throat is defined by a convex curvature formed on the flaps of the divergent portion and has a portion with a radius of curvature continuously increasing from upstream to downstream.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
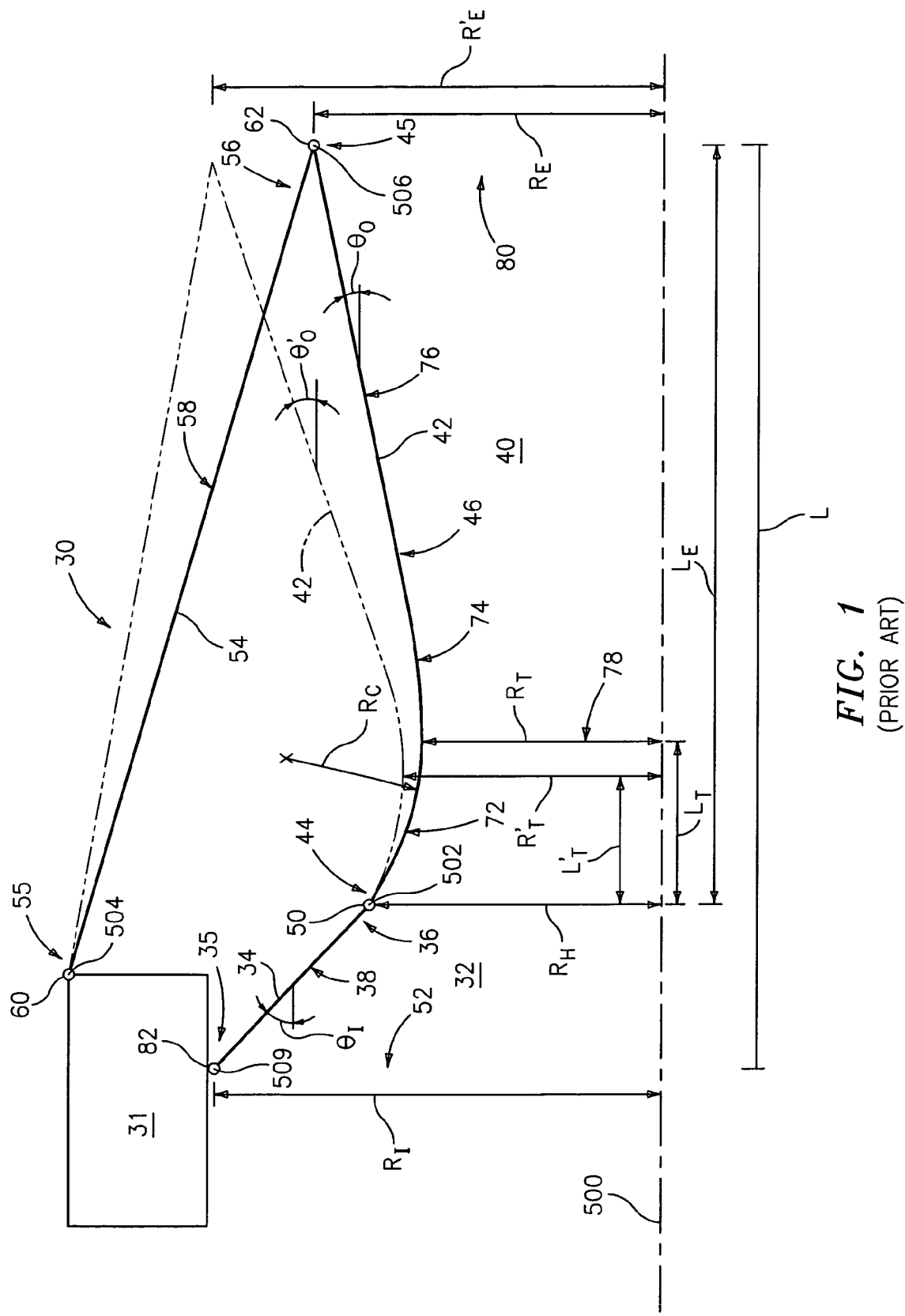
FIG. 1 is a schematic partial longitudinal sectional view of a prior art exhaust nozzle.

FIG. 1 shows an exemplary prior art nozzle 30 mounted to an engine static ring 31. In this schematicized view, various parts (e.g., actuators) and details are not shown as representing known engineering details. The nozzle has an upstream section 32 formed by a circumferential array of flaps 34 about a nozzle/engine centerline or central longitudinal axis 500. Each flap 34 extends from an upstream end 35 to a downstream end 36. Each flap 34 has an interior surface 38 which cooperate to form the interior surface of the upstream section 32. A downstream section 40 is formed by a similar circumferential array of flaps 42 shown in low mode (solid line) and high mode (broken line). Each flap 42 extends from an upstream end 44 to a downstream end 45 and has an interior surface 46.

In the exemplary embodiment, each downstream flap 42 is hinged to an associated upstream flap 34 by a hinge 50 coupling the upstream flap downstream end 36 to the downstream flap upstream end 44 for relative rotation about a hinge axis 502. The hinge 50 permits the articulation of the downstream flap 42 in a range between its high and low mode orientations. Such articulation is driven by aerodynamic pressure forces across the combination of the downstream flap 42 and an associated external flap 54.

Each external flap extends from an upstream end 55 to a downstream end 56 and has an outboard (exterior) surface 58. The upstream end is coupled to the static ring structure by a hinge 60 for relative rotation about a hinge axis 504. The downstream end 56 is coupled to the downstream end 45 of the flap 42 by a hinge 62 for relative rotation about a hinge axis 506. The external flap is configured so that its span between axes 504 and 506 may extend and contract (such as by having telescoping members). This extendability/contractability permits the aerodynamic forces acting across the divergent/external flap combination to articulate the flap combination through a range of conditions between the solid line low mode and broken line high mode, with the contraction occurring from low to high mode and extension occurring in the opposite direction.

In the exemplary embodiment, in longitudinal section the upstream (convergent) flap interior surface 38 is straight and oriented to converge toward the axis 500 in a downstream direction so that the combined interior surfaces of the array of flaps 34 provide a downstream convergent, essentially frustoconical, surface with a half angle $\theta_I$ extending from an inlet 52 at the upstream ends 35 to the downstream ends 36 and hinges 50. Each downstream (divergent) flap interior surface 46 has, in longitudinal section, an upstream portion 72 extending downstream from the upstream end 44 to a transition 74. The exemplary upstream portion 72 is inwardly convex having a substantially uniform radius of curvature $R_C$. A downstream portion 76 between the transition 74 and downstream end 45 is essentially straight. The location where the surface 72 is at a minimum radius from the axis 500 defines a throat 78 having a radius $R_T$ from the axis. The downstream portions 76, in combination, define a downstream divergent, essentially frustoconical, surface of half angle $\theta_O$ extending from the transition to an outlet/exit 80 at the downstream ends 45. In the exemplary nozzle, the nominal throat radius (and thus the associated area) may be controlled by an actuation system (not shown) mounted relative to the static ring 31 and which shifts the position of the transversely-extending axis 502 of the hinge 50 such as by rotating each convergent flap 34 about an axis 509 of a hinge 82 at its forward end 35.

In an exemplary embodiment of the prior art nozzle 30, the inlet radius $R_I$ is 18.8 inches, the angle $\theta_I$ is 43°, the flap hinge radius $R_H$ is 13.7 inches, and the radius of curvature $R_C$ is 3 inches. In low mode, the angle $\theta_O$ is 4.4°, the throat radius $R_T$ is 12.8 inches, the axial longitudinal distance $L_T$ between the throat and hinge is 1.8 inches, the exit radius $R_E$ is 14.4 inches, the hinge-to-exit axial length $L_E$ is 24 inches and the inlet to exit axial length L is 30 inches. In the low to high mode transition, the throat shifts slightly forward along the surface 72 and radially outward with the rotation of the divergent flap. The shifted throat radius is shown as $R'_T$. In high mode, $\theta'_O$ is 9°, $R'_T$ is 13.0 inches, $L'_T$ is 1.7 inch and $R'_E$ is 16.1 inch.

Various aspects involve the reengineering of the nozzle (e.g., to provide a drop-in replacement). In an exemplary reengineering, it will likely be desired to maintain the inlet radius $R_I$ for mating with the remainder of the engine. Aerodynamic performance considerations may dictate that other parameters be generally preserved (although with slightly more flexibility). For example, it may be desirable to maintain the same throat radius $R_T$ and exit radius $R_E$. It may also be desirable to reuse the upstream flaps for their configurations, thus preserving the location of the flap hinge 50.

Figure 2:
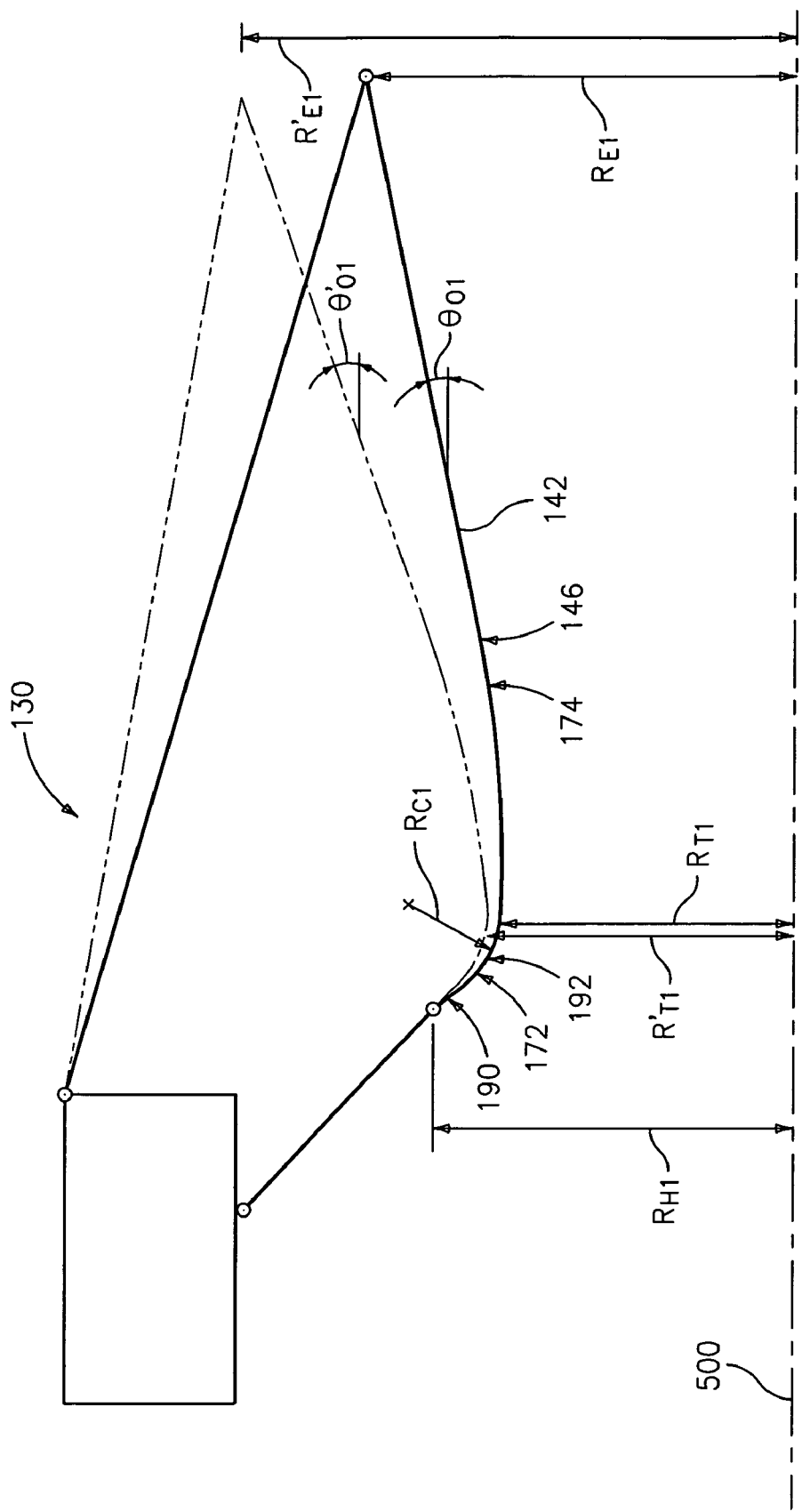
FIG. 2 is a schematic partial longitudinal sectional view of an exhaust nozzle according to principles of the invention.

FIG. 2 shows a reengineered nozzle 130 wherein analogous elements to those of the nozzle 30 of FIG. 1 are shown with like numerals incremented by 100. Illustrated elements not discussed separately are not referenced separately. On each downstream flap 142, the upstream portion 172 of interior surface 146 has a non-constant radius of curvature $R_{C1}$. Along the upstream portion 172, from upstream to downstream the radius of curvature goes from relatively large to relatively small to relatively large. Specifically, in the exemplary embodiment, an upstreammost portion 190 is straight, thus having an infinite radius of curvature. At a transition 192 at a downstream end of that portion 190, the radius changes abruptly to a value smaller than $R_C$. The radius then increases downstream to a value larger than $R_C$ at the transition 174. The increase may be continuous and smooth (e.g., as in a segment of a parabola or ellipse). In the extreme, the entire flap may be curving at a less than infinite radius (thus eliminating the straight upstream and downstream portions). Alternatively, only one such portion may be eliminated. In exemplary embodiments, the non-straight curving portion intermediate the straight portions has a longitudinal span of between 5% and 10% of a hinge-to-exit axial length.

In a first exemplary reengineering of the exemplary embodiment of the prior art nozzle 30, the flap hinge position and outlet positions are preserved, necessitating only a reengineering of the divergent flap and not the convergent and external flaps.

In a second, more extensive, exemplary reengineering of the exemplary embodiment of the prior art nozzle 30, the hinge radius $R_{H1}$ is 13.5 inch, a slight decrease. The angle $\theta_{I_1}$ is 44°, a slight increase. The radius of curvature $R_{C1}$ increases from an upstream value of 0.5 inch to a downstream value of 8.0 inches. This curvature profile brings the throat forward relative to the hinge, and, in the exemplary embodiment, relative to the inlet. In an exemplary low mode, $R_{T1}$ is 12.80 inches (relatively unchanged from the baseline), and $R_{E1}$ is 14.4 inches (relatively unchanged from the baseline). $\theta_{O1}$ is 4.3°, slightly reduced relative to $\theta_O$. In high mode, $R'_{T1}$ is 12.81 inches, $R'_{E1}$ is 16.1 inches, and $\theta'_{O1}$ is 8.9°.

The increase in hinge radius along with the more radial direction of the flap surface immediately downstream thereof helps hide the hinge from radar. The change in relative position of the throat and hinge also makes the throat radius and longitudinal position of the exemplary modification less sensitive to changes in outlet angle and exit radius during mode changes (without changes due to throttling by the actuation system). This may better control RADAR cross-section (RCS) during mode transitions by better concealing the flap hinge.

One or more embodiments of the present invention have been described. Nevertheless, it will be understood that various modifications may be made without departing from the spirit and scope of the invention. For example, details of the engine to which any particular nozzle is to be attached will dictate or influence features of the nozzle. Especially when applied as a redesign of an existing nozzle, various features of the existing nozzle may be preserved. Accordingly, other embodiments are within the scope of the following claims.

What is claimed is:

1. An exhaust nozzle for a gas turbine engine comprising:
   an upstream portion comprising a plurality of circumferentially arrayed first flaps and having an interior surface converging in a downstream direction; and
   a downstream portion comprising:
      a plurality of circumferentially arrayed second flaps, each hinged relative to an associated one of the first flaps;
      a downstream outlet; and
      an interior surface downstream of the interior surface of the upstream portion,
   wherein a longitudinal profile of said downstream portion interior surface has:
      an essentially straight first portion;
      a convex second portion downstream of the first portion and having a continuously increasing radius of curvature; and
      an essentially straight third portion downstream of the second portion.

2. The nozzle of claim 1 further comprising a plurality of circumferentially arrayed third flaps, each outboard of and hinged relative to an associated one of the second flaps.

3. The nozzle of claim 1 wherein the radius of curvature of the second portion varies from an upstream value of between 0.25 inch and 0.5 inch to a downstream value of between 8.0 inches and 14.0 inches over an axial span of at least 2.0 inches.

4. A convergent/divergent exhaust nozzle for a gas turbine engine including a hinged pivot at the juncture of where the convergent portion and the divergent portion of said nozzle meet, said convergent portion comprising a plurality of circumferentially-spaced axially-extending flaps and said divergent portion having a plurality of circumferentially-spaced axially-extending flaps, a radiused throat having a surface exposed to the working medium of the engine and being located downstream of the hinged pivot, the surface of said radiused throat being defined by a convex curvature formed on the flaps of the divergent portion and having a portion with a radius of curvature continuously increasing from upstream to downstream.

* * * * *